United States Patent [19]
Robison

[11] 3,940,175
[45] Feb. 24, 1976

[54] MULTI-PURPOSE COMBINATION TRAILER AND PICNIC TABLE

[76] Inventor: Jimmy R. Robison, Rte. 8, Box 541, Tulsa, Okla. 74106

[22] Filed: Sept. 9, 1974

[21] Appl. No.: 504,452

[52] U.S. Cl. ................................. 296/22; 312/250
[51] Int. Cl.² ............................................ B60P 3/02
[58] Field of Search ............... 296/22, 26, 27, 102; 280/47.35; 312/250

[56] References Cited
UNITED STATES PATENTS

| | | | |
|---|---|---|---|
| 1,948,937 | 2/1934 | De Muth | 296/22 X |
| 1,962,454 | 6/1934 | Meanor et al. | 296/22 X |
| 3,519,306 | 7/1970 | Young | 296/27 |
| 3,741,606 | 6/1973 | Grier | 296/22 |

*Primary Examiner*—Philip Goodman
*Assistant Examiner*—Michael J. Forman
*Attorney, Agent, or Firm*—Head, Johnson & Chafin

[57] ABSTRACT

A trailer intended to be towed behind an automobile and including readily accessible storage space therein through panels in side walls thereof to an ice chest and stove, the top of the trailer providing a sleeping surface for restingly supporting a mattress thereon, and the trailer being readily convertable to a picnic table having benches slidable out of opposite side walls of the trailer, and a telescoping canopy associated with the trailer for shading the picnic table and covering the sleeping area thereof.

7 Claims, 4 Drawing Figures

U.S. Patent  Feb. 24, 1976  3,940,175
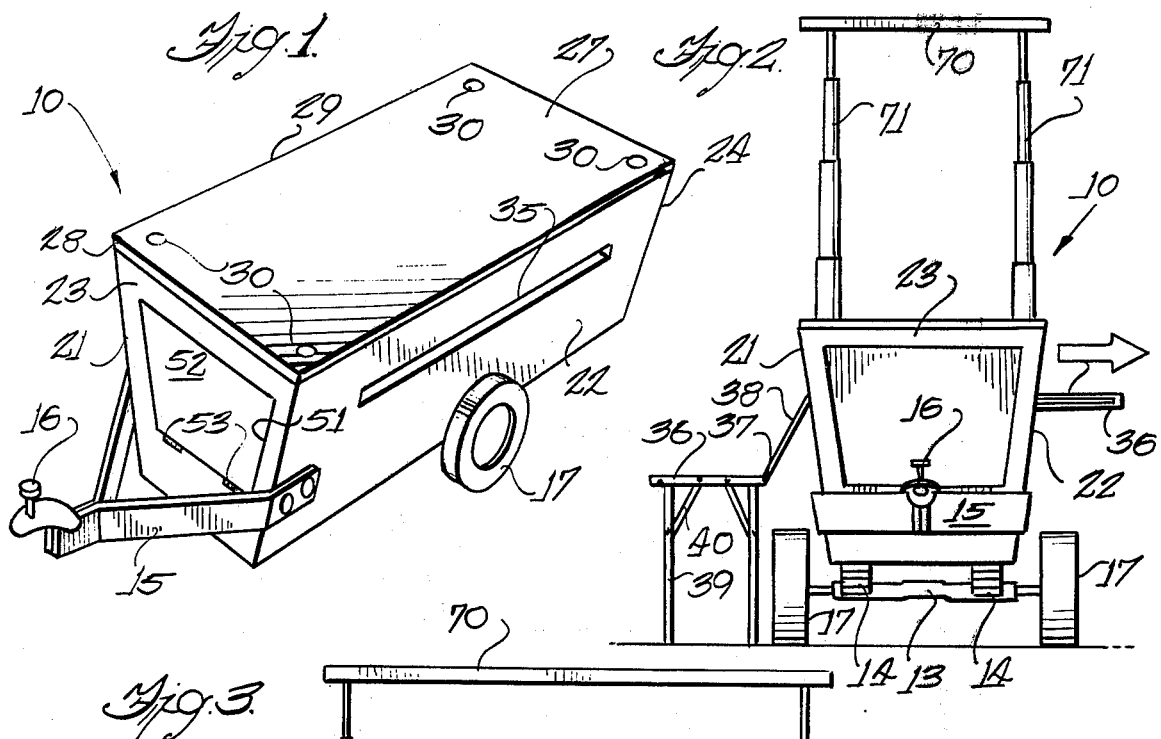
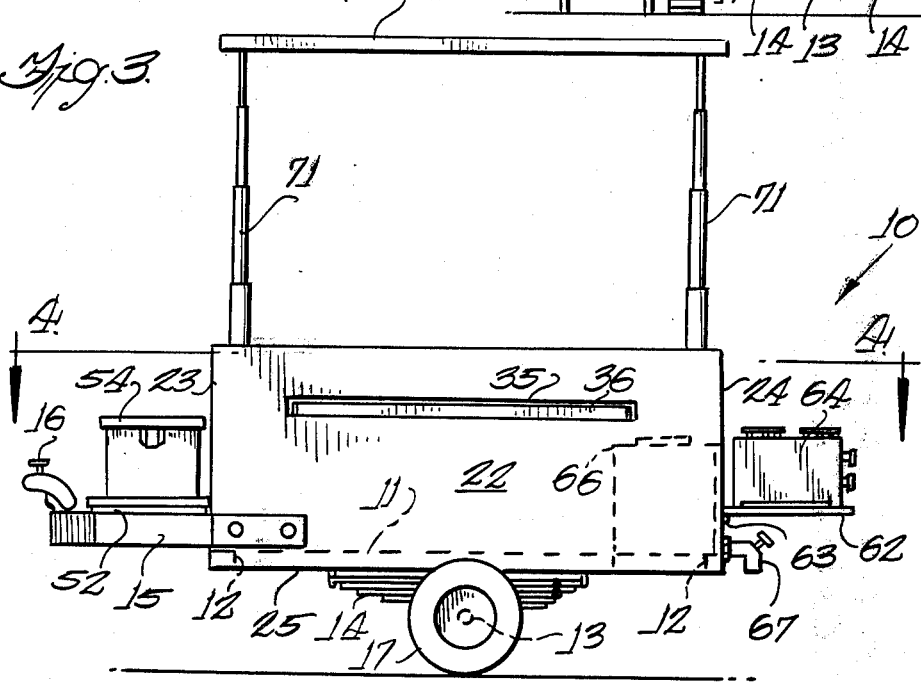
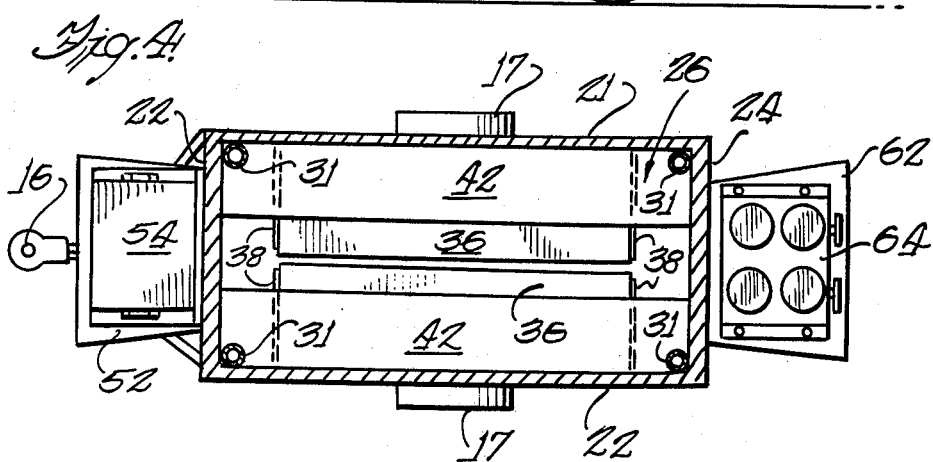

MULTI-PURPOSE COMBINATION TRAILER AND PICNIC TABLE

BACKGROUND OF THE INVENTION

1. Field of the Invention

This invention relates generally to trailers and more particularly to a novel and improved trailer readily converted to a picnic table for use at campgrounds along highways and other places where a table and benches may be desired in combination with a trailer having storage space therein for carrying supplies.

2. Description of the Prior Art

Picnic facilities, especially those near large metropolitan areas, are usually greatly overcrowded during the warmer summer months with the picnic tables normally being taken at an early time in the day. Thus, if an individual wishes to be assured of having a picnic table available, the individual must usually make advance reservations or arrive at an early time at the selected picnic grounds.

It would thus be desirable to provide a readily and easily transported portable picnic table with the desired stability for ease of use thereof.

In addition, those individuals who wish to select their own campsite at locations where picnic table and other facilities are not generally provided must carry the necessary equipment in the automobile or a trailer towed therebehind, and at the site must then unpack the automobile or trailer to set up the desired picnic area.

It would thus be desirable to provide a trailer having readily accessible storage areas for readily reachable and usable items needed in camping in a rapid manner, including a picnic table arrangement.

SUMMARY OF THE INVENTION

The present invention provides a novel multi-purpose combination trailer and picnic table in the form of a trailer designed to be attached to the rear of an automobile and towed thereby, the trailer constructed and arranged such that parts thereof form a picnic table and a pair of benches with camping paraphernalia and food supplies being readily carried in the trailer along with there being readily accessible a portable ice chest and a self-contained portable stove carried in appropriate compartments in the trailer.

It is a feature of the present invention to provide a multi-purpose combination trailer and picnic table.

A further feature of the present invention provides a combination trailer and picnic table wherein the trailer may be readily converted into a picnic table having self-contained seating benches at the desired point of usage.

Still a further feature of the present invention provides a combination trailer and picnic table which is extremely simple to convert and which is easily towed behind an ordinary passenger automobile.

Still yet a further feature of the present invention provides a combination trailer and picnic table which is relatively inexpensive to manufacture due to its simplicity of construction such that it may be retailed at a sufficiently low price to encourage widespread use thereof, the trailer having a large storage and carrying capacity.

Still yet a further feature of the present invention provides a combination trailer and picnic bench which is of a rugged and durable construction and which therefore may be guaranteed by the manufacturer to withstand many years of intended usage.

Among further features and advantages of this invention is the provision of a combination trailer and picnic table which is easy to use and reliable and efficient in operation; one which is aesthetically pleasing and refined in appearance; and one which is well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the combination trailer and picnic table of the invention;

FIG. 2 is a front end elevational view of the trailer partially converted to use as a picnic bench;

FIG. 3 is a side elevational view of the trailer showing the ice chest and self contained stove projecting outwardly from their associated compartments; and FIG. 4 is a cross-sectional view taken along Line 4—4 of FIG. 3.

DESCRIPTION OF THE PREFERRED EMBODIMENT

Referring now to the drawings in detail there is illustrated a preferred form of a multi-purpose combination trailer and picnic table constructed in accordance with the principles of the present invention and designated generally in its entirety by the reference numeral 10.

The trailer 10 includes a pair of parallel longitudinal side frame members 11 having their ends interconnected by transverse cross-members 12 and including an axle 13 extending normal to the side members and supported on a pair of leaf springs 14 from the side members. A yoke shaped tongue member 15 is secured to the members 11 and 12 and project outwardly from the front end of the trailer to terminate at a conventional coupler 16 adapted to be engaged by an associated trailer hitch (not shown) on the back of the towing automobile (not shown). Associated with each end of axle 13 is one of a pair of wheels 17.

Extending upright from each side frame 11 are vertical side walls 21 and 22, and connected along the peripheral front and back edges thereof and extending upright from associated cross-member 12 are vertical front end walls and back end walls 23 and 24 respectively. A bottom 25 is provided associated with frame members 11 and 12 and which, with the wall surfaces 21-24 defines interiorly thereof a compartment 26 opening out of the top end of the trailer and which is closed by flat rectangularly shaped cover member 27 hingedly connected by hinge 28 extending along its back side edge 29 to the top edge of side wall 21 to provide selective swingable movement of the cover thereabout to provide selected access to compartment 26. Disposed in each of the corners of cover 27 are removable caps 30 which may be threaded into suitable openings in the cover or may be of the friction type cylindrical configuration to be frictionally inserted into suitable openings in the cover to close the same. Each of covers 30 is disposed axially above an associated socket 31 affixed in the corners of compartment 26 and projecting vertically relative thereto, the use thereof which will be later described.

A horizontal slot 35 extends through each of the side walls 21 and 22 with each slot having slidably inserted therein a bench member 36 of a flat rectangular configuration and having its corners nearest the trailer side wall connected by brackets 38 to guide tracks in the compartment 26 for retaining the bench in a position adjacent the associated trailer side wall when removed from the compartment and permitting ease of reinsertion of the bench into the compartment through its associated slot. Each bench 36 has associated therewith leg members 39 pivotally supported by brackets 40 to be opened to support the bench on the ground when apart from the trailer, and foldable flat against the bench to permit for the bench to be reinstated through is associated slot 35 for storage purposes in the trailer.

Disposed above each bench running longitudinally of the trailer adjacent each side edge 21 and 22 are a pair of storage shelves 42 which are transversely spaced apart and which provide increased storage space in the trailer which is readily accessible upon the lifting of cover 27.

Front trailer end wall 23 is provided with a rectangular opening 51 closable by door 52 connected by hinges 53 to the front trailer end and which provides access to interior compartment containing portable ice chest 54 which is slidable outwardly from the compartment to rest on the interior of door 52 when in the open position resting on the top edges of tongue 15 to provide ease of access to the ice chest. Suitable tracks for guiding and supporting movement of the ice chest into and out of the trailer may be provided.

Similarly, disposed in trailer back end wall 24 is a rectangular opening closable by door 62 connected by hinges 63 to the trailer back end wall and swingable between a vertical position closing the opening and a horizontal position providing a platform onto which a self-contained cooking stove 64 may be slide for ease of access and use thereof.

In addition, disposed in compartment 26 rearwardly thereof is a water container 66 which is connected by suitable piping to a water discharge spout 67 projecting rearwardly of trailer back end wall 23 for ease of access to dispensing a desired quantity of water from the container at any time.

A canopy 70 of a flat rectangular configuration is provided having its corners supported by telescoping leg members 71 each having their base ends thereof received in associated sockets 31 to provide an overlapping canopy over the cover 27 for shading the picnic table as well as to protect the top surface of the cover 27 from the elements, this being preferable when a mattress (not shown) is supported on the cover for overnight sleeping of an individual, short naps, and the like.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A multi-purpose combination trailer and picnic table intended for towing behind automobiles comprising:
   a horizontally disposed frame having longitudinally extending side frame members and transversely extending cross frame members;
   an axle extending transversely of the frame and having a wheel rotatably supported on each end thereof;
   a tongue associated with the front end portion of the frame and projecting outwardly therefrom adapted to be connected to the towing automobile;
   a horizontal bottom surface supported by the frame;
   a pair of transversely spaced apart longitudinally extending vertically disposed side wall members;
   a pair of longitudinally spaced apart transversely extending vertically disposed front and back end wall members interconnecting the side wall members at opposite ends thereof;
   a compartment defined by the wall members and bottom floor member and opening out of the top of the trailer;
   a flat rectangularly shaped cover member closing the top of the compartment and movable relative thereto between a position providing access to the compartment and a position completely closing the compartment;
   a pair of flat elongated rectangularly shaped bench members, each member of a length less than the length of an associated sidewall slot and associated with the slot to be slid therethrough between a protected enclosed storage position within the trailer compartment and an operable position disposed exteriorly of the trailer in a position in the proximity of the cover member whereby the upper surface of the cover member may be utilized as a table top by a person disposed on said bench members;
   means for guiding the movement of the benches between the exterior use and the interior storage position; and
   a canopy telescopically supported relative to the cover member to be elevated thereabove to provide a shade and weather protective element therefor.

2. The combination trailer and picnic table as set forth in claim 1 wherein each of the bench members comprises:
   a flat seat forming member having opposed end edges;
   a multitude of leg members each hingedly associated with the seat member and swingable between an extended position normal to the seat member to support the seat member on a ground surface in the exterior position of said bench member, and swingable to a storage position disposed adjacent one surface of the seat member for storage of the bench within said compartment;
   and said guide means comprises:
   a pair of elongated rigid brackets each having one end pivotally connected to a corner of an edge of the seat member and projecting outwardly therefrom in the direction of the associated trailer side wall member, the opposite end of each bracket being pivotally associated with the side wall member for guiding the movement of the bench between the storage position and the operative exterior position.

3. The combination trailer and picnic table as set forth in claim 2 further characterized by an opening extending vertically through each corner of the cover member; a cap member associated with each opening and removably inserted thereinto; and a vertical socket member affixed to each corner of the trailer compartment in axial alignment with an associated one of the openings and adapted to receive therein the base end of an associated one of the telescoping supports of the canopy.

4. The combination trailer and picnic table as set forth in claim 3 further characterized by a rectangular opening disposed in the trailer front end wall; a door associated with the opening and hinged to the front end wall to provide selective opening and closing of the opening, the door when opened resting on the top edges of the tongue, the door providing access to a front end portion of the trailer compartment having a portable self-contained ice chest carried therein and slidable between a storage position inwardly of the trailer compartment and an operative position resting on the interior surface of the door when open to form a horizontal platform resting on the tongue.

5. The combination trailer and picnic table as set forth in claim 4 further characterized by a rectangular opening disposed in the trailer back end wall member; a door associated with the opening and hinged to the back end wall for swingable movement between a position closing the opening and a horizontal position defining a horizontal platform and providing simultaneous access to the back end portion of the trailer compartment; and a self-contained stove carried in the compartment and slidable between a storage position inwardly of the compartment and an operative position resting on the interior of the door defining horizontal platform.

6. The combination trailer and picnic table as set forth in claim 5 further characterized by a pair of longitudinally extending transversely spaced apart flat shelf members each extending through the trailer compartment adjacent an associated interior surface of a side wall member spaced vertically above the storage position of the benches.

7. The combination trailer and picnic table as set forth in claim 6 further characterized by a water container supported in the rear end portion of the trailer compartment; and a water spout affixed to the back end portion of the trailer and projecting outwardly therefrom and in communication with the water container for the dispensing of any desired quantity of water therefrom exterior of the trailer.

* * * * *